United States Patent Office 2,894,967
Patented July 14, 1959

2,894,967
ORGANOSILICON-CHROMIUM COORDINATION COMPLEXES

John W. Gilkey, Midland, Mich., assignor to Dow Corning Corporation, Midland, Mich., a corporation of Michigan No Drawing. Application August 2, 1956
Serial No. 601,622

10 Claims. (Cl. 260—438)

The present invention relates to organosilicon-chromium complexes of the Werner type.

The use of various organosilicon compounds to render leather or textile fabrics water repellent is well known. Those organosilicon compounds which have been found to provide commercially acceptable results, however, are subject to the disadvantage that they must be employed either as a solution in an organic solvent or in the form of an emulsion. It is obvious that a water soluble material would have both economical and procedural advantages over such compounds.

It is an object of the present invention to provide novel organosilicon compositions which are capable of rendering various manufactured articles water repellent, particularly articles of leather and textile fabrics, and which are capable of being dissolved in water or in solvents which provide solutions which are themselves soluble in water. It is a further object of the invention to provide novel organosilicon compositions which are capable of providing an improved degree of water repellency and/or an improved retention of water repellent properties after laundering or dry cleaning the treated article. Another object is to provide organosilicon compositions which can be used to treat leather not only to render it water repellent but to tan the leather as well. Other objects and advantages will be apparent from the following description.

The compositions of this invention comprise coordination complexes of the Werner type and are the reaction products formed by reacting Cr(OH)Cl₂ with an organosilicon compound containing units of the formula $$R_nSi(R'COOH)O_{\frac{3-n}{2}}$$

where R is a monovalent hydrocarbon radical, R' is a divalent alkylene radical of at least 2 carbon atoms with the carboxyl group being at least 2 carbon atoms removed from the Si, and n is an integer of from 0–3 inclusive. The invention also includes the hydrolyzed and ammoniated derivatives obtainable from such reaction products.

The compounds comprising the compositions of this invention are not normal chromium salts, for the properties of the former differ radically from those of such salts. Although it is not possible to ascertain the exact structure of these compounds, it is apparent that they are complexes of the so called "Werner" type. There are several prevalent theories as to the structure of such complexes, and according to the more widely accepted theories the products of this invention possibly take the general form:

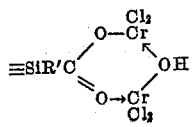

In the presence of small amounts of water, the product may ionize to a form such as:

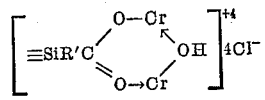

In these formulas, the open valences of Si would be satisfied by R radicals and/or oxygen atoms which are themselves linked to other Si atoms.

As is well known, the Werner theory is that certain atoms can exert auxiliary valences in addition to the principal valences occurring in simple compounds. The auxiliary valences can hold various groups to the atom exerting them and thus said atom becomes the nuclear atom of a complex compound or complex ion. It is known that chromium can hold a total of 6 groups within a complex by its combined principal and auxiliary valences. These groups are called "coordination groups" and thus chromium is said to have a coordination number of 6. Other groups can also be associated with the chromium but such additional groups are considered as being present as ions and as being outside of the chromi-nuclear complex. As is known, there can be more than one nuclear chromium atom within such complexes, for the chromium atoms can be linked together by their coordination through bridging groups. Each bridging group occupies only a single coordination position so that each chromium atom may have an additional 5 coordination groups.

The theoretical structure shown above is only that of one particular possible complex. It is obvious that the complex nature of the reaction product permits the use of non-stoichiometric proportions of the starting compounds without necessarily bringing about the presence of the theoretically "excess" reactant in unreacted form in the product. Preferably, however, the reactants contain from 1–2 inclusive chromium atoms for every silicon bonded carboxylic group.

It is to be understood that in forming the coordination complexes of this invention it is not necessary that the compound Cr(OH)Cl₂ be added as such to the reaction mixture. It is known that chromyl chloride, i.e. CrO₂Cl₂, can be reduced to Cr(OH)Cl₂ as for example by its reaction with an alcohol. Therefore the invention is inclusive of those complexes formed from the defined reactants even though the Cr(OH)Cl₂ is in fact formed in situ by the reduction of chromyl chloride and thus has only a fleeting existence prior to its reaction with the organosilicon reactant. Another method by which Cr(OH)Cl₂ can be formed in situ, and which is thus within the scope of this invention, is that of dehydrating chromic chloride hexahydrate, CrCl₃·6H₂O. This dehydration can be effected by the use of chemical dehydration agents (e.g. acetic anhydride, preferably with glacial acetic acid present as a solvent), or by merely heating the hexahydrate until a molten mass is obtained (preferably in the region of 100° to 175° C.).

The defined organosilicon reactants include both polymers and copolymers containing the defined units, and compounds in which the "unit" actually represents the entire molecule, i.e. where n in the formula represents the integer 3. Thus the reactants include monomers of the formula R₃SiR'COOH, polymers in which all of the units are of the formula $$R_ySi(R'COOH)O_{\frac{3-y}{2}}$$

where y is an integer of from 0–2 inclusive, and copolymers in which only some of the polymeric units are of the latter formula. The reactants thus include organosiloxane copolymers containing the latter units and in which the remaining units are of the formula $$R''_m SiO_{\frac{4-m}{2}}$$

where R'' represents a monovalent hydrocarbon radical and $m$ is an integer of from 0-3 inclusive. The units present in the latter copolymer are preferably such that the average value of $m$ in the copolymer is from 0.5-3 inclusive.

In the above monomers, polymers, and copolymers, the R and R'' radicals can be the same or different on each silicon atom or on different silicon atoms. It can be seen that the reactant polymers can contain units of the formula $HOOCR'SiO_{1.5}$, $RSi(R'COOH)O$, or $$R_2Si(R'COOH)O_{.5}$$

or can be copolymers of any two or more different units falling within these formulas, or can be copolymers of any one or more of these units with one or more units of the formula $SiO_2$, $R''SiO_{1.5}$, $R''_2SiO$, or $R''_3SiO_{0.5}$.

As noted above both R and R'' can be any monovalent hydrocarbon radical. Examples of suitable radicals are: alkyl such as methyl, ethyl, and octadecyl; aralkyl such as benzyl; aryl such as phenyl and xenyl; alkaryl such as tolyl; cycloaliphatic such as cyclohexyl; and alkenyl such as vinyl, allyl, and octadecenyl, although it is preferred that the R radicals be free of aliphatic unsaturation of the latter type. The most preferred radicals are methyl and phenyl.

The R' radicals in the above formula are divalent alkylene radicals containing at least two carbon atoms and are of a configuration such that the COOH group is attached to a carbon atom in the alkylene radical which is at least as far removed from the silicon atom as the beta position. The preferred radicals range from ethylene to octadecylene radicals, and can be either straight or branched chain radicals. Examples of suitable organosilicon reactants are those containing the following substituents:

$$\equiv SiCH_2CH_2COOH, \equiv Si(CH_2)_{17}COOH$$

$$\equiv SiCH_2CH(CH_3)COOH$$

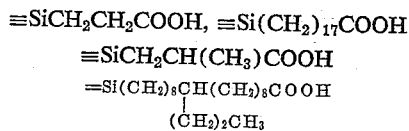

Carboxy substituted reactants of the type described above are known in the art. In general they can be prepared by reacting an alkyl ester of an unsaturated aliphatic monocarboxylic acid with silicon compounds containing silicon bonded hydrogen (such as $$R_nHSiO_{\frac{3-n}{2}}$$

$RSiH_3$, $R_nSiH(OR)_{3-n}$, or $R_nSiHCl_{3-n}$) in the presence of various catalysts such as organic peroxides (particularly t-butyl perbenzoate or benzoyl peroxide), platinum deposited on finely divided charcoal, or chloroplatinic acid, followed by the hydrolysis of the ester radical. When a hydrocarbonoxy- or halohydrogenosilane of the latter two types is employed as the reactant, the corresponding hydrolyzable derivatives are obtained and these can be hydrolyzed or cohydrolyzed with silanes such as $R''_m SiCl_{4-m}$ to produce some of the polymers and copolymers which have been defined as reactants in this invention. A simple illustration of the above described reaction is that with methacrylic acid, as follows:

$$\equiv SiH + CH_2=CH(CH_3)COOCH_3 \rightarrow$$
$$\equiv SiCH_2CH(CH_3)COOMe$$

Intermediates of the latter type are then converted to the corresponding acid by the conventional hydrolysis of the ester radical, e.g. by heating the material in an aqueous alcoholic alkali solution. In this manner the above illustrative intermediate is converted to $$\equiv SiCH_2CH(CH_3)COOH$$

Methods of the above type are more fully illustrated in U.S. Patent No. 2,723,987 and in the copending application of Leo H. Sommer, Serial No. 522,826, filed July 18, 1955. Other more complex methods for preparing the carboxy substituted silicon reactants employed herein are illustrated in U.S. Patent No. 2,589,446.

It has been noted above that the $Cr(OH)Cl_2$ employed herein can be produced in situ by the reduction of chromyl chloride. This reduction can be carried out by the reaction of the latter with an alcohol. Thus chromyl chloride, an alcohol such as ethanol, and an inert solvent such as $CCl_4$ can be heated and the above described organosilicon reactants added thereto to form the complexes of this invention. In such a case the ethanol reacts with the chromyl chloride to form acetaldehyde, which is further oxidized by reaction with additional chromyl chloride to acetic acid. This reduction results in the production of the desired $Cr(OH)Cl_2$, which can then react with the carboxylic organosilicon reactants. In an alternative process of this invention, however, alcoholic organosilicon reactants can act as the reducing agent upon chromyl chloride to furnish the required $Cr(OH)Cl_2$. In the latter case the said organosilicon alcohol is at the same time oxidized to form the required corresponding carboxylic substituted organosilicon reactant.

Thus an optional method of preparing the complexes of this invention is that of reacting chromyl chloride with an organosilicon compound containing units of the formula $$R_n Si(R'CH_2OH)O_{\frac{3-n}{2}}$$

where R, R' and $n$ are as above defined. It can be seen that the latter alcoholic reactant is identical to the formerly described carboxylic reactants except that the $-CH_2OH$ substituent has been substituted for $-COOH$. Thus monomers of the formula $R_3SiR'CH_2OH$, polymers containing $$R_y Si(R'CH_2OH)O_{\frac{3-y}{2}}$$

units where $y$ is as above defined, and copolymers of the latter units with the previously described $$R''_m SiO_{\frac{4-m}{2}}$$

units are all applicable as reactants with chromyl chloride in accordance with the process of this invention. A simplified illustration of this type of reaction is as follows:

$$HOCH_2R'Si\equiv + CrO_2Cl_2 \longrightarrow$$
$$Cr(OH)Cl_2 + HOOCR'Si\equiv \longrightarrow \left[\equiv SiR'C\begin{matrix}O-Cr\\ \\O\rightarrow Cr\end{matrix}\begin{matrix}\\OH\end{matrix}\right]4Cl^-$$

The alcoholic substituted monomers, polymers and copolymers described above can be prepared by reacting an ester prepared from the appropriate unsaturated alcohol and a saturated acid, and the above described hydrogen substituted silicon reactants, with platinum on charcoal, chloroplatinic acid, or benzoyl peroxide as catalysts, followed by the alcoholysis of the reaction product. The reaction is carried out in much the same manner as the reaction described previously where an ester of an unsaturated acid was employed. The reaction can be illustrated as follows:

$$\equiv SiH + CH_2=CHCH_2OOCCH_3 \rightarrow$$
$$\equiv SiCH_2CH_2CH_2OOCCH_3$$

Reaction products of the latter type can then be subjected to conventional alcoholysis reactions, as for example by heating them in the presence of ethanol and catalytic amounts of NaOH or KOH, to produce the required alcoholic substituted intermediates, which in the above illustrative case would have the formula $$\equiv SiCH_2CH_2CH_2OH$$

Where reactants such as $HSiCl_3$, $RHSiBr_2$, $RHSi(OR)_2$, and the like have been used as reactants, the intermediate prior to alcoholysis contains the corresponding hydrolyzable substitutents. Such intermediates can of course be hydrolyzed or cohydrolyzed with $$\frac{R_mSiCl_{4-m}}{2}$$

type compounds at the same time that the alcoholysis of the —OOCCH$_3$ type radical is being carried out, thus producing the corresponding siloxane polymers or copolymers containing the —R'CH$_2$OH groups.

Reactions of the above type are more fully illustrated in the copending application of John L. Speier Serial No. 463,061, filed October 18, 1954, now abandoned. Other appropriate methods for preparing these alcoholic substituted organosilicon reactants are shown in U.S. Patent No. 2,629,727.

A particularly convenient method for preparing the hydroxypropyl substituted copolymeric siloxanes which can be employed herein as reactants is that of reacting allyl alcohol with an organohalosilane to produce an allyloxyorganosilane, then adding another silane molecule at the double bond by reacting the allyloxy compound with a $\equiv$SiH compound in the presence of Pt deposited on charcoal or chloroplatinic acid as a catalyst. The hydrolysis of the resulting reaction product and equilibration of the hydrolyzate provides a copolymer containing hydroxypropyl substituted siloxane units and conventional hydrocarbon siloxane units. The ratio of the latter units in the copolymer can be varied by including other hydrolyzable hydrocarbonsilanes (e.g. $R''_mSiCl_{4-m}$) in the hydrolysis mixture. Alcoholic substituents other than hydroxypropyl can be obtained by using corresponding unsaturated monohydric aliphatic alcohols.

An illustrative example of the above type of reaction is the method by which the dimethylsiloxane-hydroxypropylmethylsiloxane copolymers of Examples 1 through 5 and 8 through 11 herein were prepared. Me$_2$SiCl$_2$ was reacted with allyl alcohol (for simplicity, Me and Ph are used herein to represent methyl and phenyl radicals respectively). The reaction was incomplete, so a product of the empirical formula $Cl_6SiMe_2(OCH_2CH=CH_2)_{1.5}$ was obtained (representing an equimolar mixture of the diallyloxy and monoallyloxy compounds). This product was reacted with MeHSiCl$_2$ at about 110° C. in the presence of Pt deposited on charcoal as a catalyst to produce a reaction product of the empirical formula $$Cl_{.5}SiMe_2(OCH_2CH_2CH_2SiMeCl_2)_{1.5}$$

i.e. an equimolar mixture of $$ClSiMe_2(OCH_2CH_2CH_2SiMeCl_2)$$

and $SiMe_2(OCH_2CH_2CH_2SiMeCl_2)_2$. Hydrolysis of the latter products followed by the attendant typical organosilanol condensation and polymerization reaction brought about cleavage between the Si and —OCH$_2$— to produce hydroxy-propyl substituents, and also converted all silicon bonded chlorine atoms to siloxane linkages. Thus a copolymer consisting of Me$_2$SiO and $$(HOCH_2CH_2CH_2)MeSiO$$

units, in the ratio of 2:3 for the particular case illustrated above, was obtained. To increase the relative amount of Me$_2$SiO units present in the copolymer, it is only necessary to add, e.g., Me$_2$SiCl$_2$ to the above "reaction product" prior to hydrolysis.

Because of the availability and ease of preparation of the necessary intermediates, and the superior properties of the complex products, the most preferred alcoholic organosilicon reactants are the copolymers of units of the formula Me$_2$SiO and/or PhMeSiO with $$(HOCH_2CH_2CH_2)MeSiO$$

units. The most preferred of the carboxyl substituted reactants are the copolymers of Me$_2$SiO and/or PhMeSiO with (HOOCCHXCH$_2$)MeSiO units, where X is hydrogen or methyl (i.e. the derivatives obtainable from alkyl acrylates or methacrylates). Whatever the nature of the alcoholic or carboxylic substituents, it is preferred that any copolymeric organosiloxane reactant employed to prepare the Cr complexes contains at least 3 molar percent of Si atoms having such substituents attached thereto.

The complexes of this invention are obtained no matter what the order of addition of reactants may be. It has been noticed, however, that when the CrO$_2$Cl$_2$ is being added to an alcoholic copolymeric siloxane, for some unexplained reason in many systems the reaction product gels when about 1 Cr per Si bonded alcoholic substituent has been added. Although such gels are coordination complexes within the scope of this invention, and are ordinarily soluble in methanol, the gelation hinders the further effective addition of CrO$_2$Cl$_2$ which is desired in order to provide the preferred 2:1 ratio of Cr to Si bonded alcoholic substituents. Thus it is preferred to reverse the above order of addition, i.e. to add the copolymer to the CrO$_2$Cl$_2$. From the commercial viewpoint the use of CrCl$_3$·6H$_2$O as a reactant, as described previously, is highly desirable because it avoids the handling of the highly reactive and corrosive chromyl chloride.

In order to facilitate the contacting of the reactants throughout the reaction, it is preferable to use a substantially anhydrous inert solvent. In the reactions which use CrO$_2$Cl$_2$ as a reactant, CCl$_4$ has been found highly suitable for this purpose. Where CrCl$_3$·6H$_2$O is being dehydrated with acetic anhydride, glacial acetic acid is preferred as the solvent.

All of the described reactions are preferably conducted in the substantial absence of free water, it being understood that the latter term is not inclusive of water which is chemically associated with the reactants or product, e.g. by hydration or coordination. When water is produced during the course of the reaction, as by the reduction of CrO$_2$Cl$_2$ with an alcohol, it apparently coordinates with the complex chromium product and hence is present only momentarily as free water. The use of an aliphatic alcohol in the latter method also leads to the production of the corresponding acid, which may itself form coordination complexes or may become a part of the complexes formed from the organosilicon reactants.

A wide range of temperatures is suitable for the reactions employed herein, from room temperature upwards. To promote the speed and completeness of the reaction, however, an elevated temperature is preferred, e.g. from 50° to 150° C. A convenient working temperature is the refluxing temperature of the particular system. Atmospheric, superatmospheric, or reduced pressures can be used. Since an effective contacting of the reactants is obviously desirable, it is preferred that at least a portion of the reaction mass be retained in the liquid phase.

The chlorine-containing complexes of this invention can be hydrolyzed or ammoniated to form the corresponding derivative complexes in which the chlorine atoms are replaced by hydroxyl groups or amino groups. Hydrolysis takes place in a wet alcohol solution of the chlorine-containing complex, followed by a slow condensation or polymerization which in such a system can lead to the gelation of the solution after several days at room temperature. When the original complex is applied to a material to render it water repellent, the hydrolysis can take place from absorbed water in the material and/or from atmospheric moisture. If desired, additional water can be supplied, e.g. as vapor, to hasten the process. The hydrolysis can be largely or entirely carried out prior to the treatment if a water solution or a wet alcohol solution of the original complex is used as a treating solution. Polymerization or "setting" of the complex to a completely water-insoluble and organic solvent-insoluble state takes place slowly when the treated material is air-dried, but of course takes place rapidly when the material can be heated. Temperatures of about 130° F. are suitable in this regard for treated leather, while temperatures of 100° to 150° C. are suitable for textiles such as wool and cotton.

The ammoniated derivatives of this invention are prepared by adding anhydrous ammonia to an anhydrous alcoholic solution of the chlorine-containing complexes. The resulting precipitated ammonium chloride is removed by filtration.

The complexes of this invention are soluble in methanol. They are also soluble, but to a progressively lesser degree, in ethanol, isopropanol, acetone, and water. Solutions in water, however, tend to gel after standing for a few days. In general the complexes are insoluble in solvents such as benzene, toluene, and perchloroethylene. This insolubility undoubtedly accounts, at least partially, for the retention of water repellency exhibited by treated articles after dry cleaning.

Complexes equivalent to the chloride-containing complexes of this invention, but containing fluorine or nitrate groups in place of the chlorine, can be prepared by the same types of reactions as those which have been described above, by using chromyl fluoride or basic chromic nitrate, $Cr(OH)(NO_3)_2 \cdot 5H_2O$, as the reactants.

The complexes of this invention can be used to provide thin, invisible, tightly bound water-repellent films on a variety of surfaces such as paper, textile fibers and fabrics, tanned leather, metals, organic resin films, glass, glass fibers, and ceramics. When applied to untanned leather, the complexes not only render it water repellent but tan the leather as well, providing the light blue appearance of conventional "chrome tanned" leather.

The following examples are illustrative only. All parts given are parts by weight. For brevity the symbols Me, Et, Vi, Ac, and Ph have been used to designate methyl, ethyl, vinyl, acetyl, and phenyl radicals respectively.

*Example 1*

25.3 parts of a copolymer containing 25 mol percent $HOCH_2CH_2CH_2MeSiO$ units and 75 mol percent $Me_2SiO$ units (providing 0.074 mol hydroxypropyl) were mixed with 633 parts of anhydrous $CCl_4$. The mixture was held at reflux temperature while 12.4 parts (0.08 mol) of $CrO_2Cl_2$ in 158 parts of $CCl_4$ was added thereto over a period of 5 hours. The red chromium solution became green as soon as it contacted the siloxane. When the addition was complete the reaction mass was held at reflux temperature for an additional 3 hours. A major portion of the solvent present was then strip distilled from the reaction mixture at reduced pressure, and the last traces of solvent were removed by heating the material over a steam bath at a pressure of 2 mm. Hg. The resulting product was the chromium coordination complex of the starting polymer. It was a glassy solid of a rather greenish-black color, and was found to be completely soluble in methanol to the extent of at least 32.8 percent solids. A methanol solution containing 2 percent solids was prepared. By adding water to the solution until cloudiness appeared, it was found that it could be diluted until the solvent contained about 94 percent water before any cloudiness occurred. The solution in wet methanol was the hydrolyzed or partially hydrolyzed derivative of the original chromium coordination complex. When a portion of the concentrated methanol solution was evaporated to dryness and held for 16 hours at 120° C., the resulting solid material was found to be no longer soluble in methanol.

*Example 2*

By the same method as that employed in Example 1, a complex was prepared by reacting 50 parts of the same copolymeric siloxane (0.146 mol of hydroxypropyl) and 45.4 parts $CrO_2Cl_2$ (0.293 mol) in a total of 952 parts $CCl_4$. After removing the solvent a greenish-black granular solid was obtained which upon analysis showed a Si/Cr ratio of 2.1 as compared with the theoretical value of 2.0. This material was also found to be completely soluble in methanol to yield a clear deep green solution, and almost completely soluble in acetone providing an opaque yellowish-green solution. A small portion was made into a 2 percent solids solution in methanol and water added thereto until cloudiness developed. It was found that the solution remained clear until sufficient water had been added so that the methanol contained about 91 percent water.

*Example 3*

55 parts of a copolymer containing $HOCH_2CH_2CH_2MeSiO$ units and $Me_2SiO$ units in the molar ratio of $\frac{1}{12}$ (thus containing 0.055 mol of hydroxypropyl substituents) was reacted with 9.3 parts $CrO_2Cl_2$ (0.06 mol) in a total of 792 parts of $CCl_4$, using the method of Example 1. Upon removing the solvent, the complex was obtained as a brownish-black glassy solid which upon analysis showed a Si/Cr ratio of 7.25 as compared with the theoretical value of 6.5. This material was also found to be soluble in methanol, but a solution in methanol containing 2 percent solids became slightly cloudy when sufficient water had been added so that the methanol contained about 48 percent water.

*Example 4*

The solid products of Examples 2 and 3 were each made up as a 15 percent solids solution in a solvent of equal parts of methanol and water. 6 samples of suede leather, each weighing 20 g., were each tumbled at room temperature in 400 g. of water for 15 minutes. 10 g. of the solution of the Example 2 product was then added to the water surrounding each of 3 of the leather samples, and 10 g. of Example 3 product was added to each of the remaining 3 samples. The tumbling was then continued for 1 hour, after which it was found that the pH of the liquor surrounding each sample was about 3.1. Sufficient sodium bicarbonate was added to each sample to raise the pH thereof to about 3.7 and the tumbling of each sample was continued for a few minutes. Each leather sample was then removed from its treating liquor and was allowed to air dry until a constant weight was attained. The efficiency of the water repellent treatment for each sample was then determined by conducting the "dynamic absorption" test, which is a standard test in the leather industry. Briefly this test consists of weighing a 4" x 4" sample of leather which has reached constant weight at room temperature and humidity conditions, tumbling the sample in 500 g. of water at 80° F. for 20 minutes, then removing the leather and blotting it lightly with a dry towel to remove the surface water therefrom. The dynamic absorption value is expressed as the percent weight gained. The leather samples treated with the Example 2 material averaged 151 percent and those from the Example 3 material averaged 69.3 percent in this test, whereas untreated suede averages about 300 percent. After the samples had again air dried to a constant weight they were given a conventional dry cleaning treatment with perchloroethylene, and again allowed to air dry to a constant weight. The dynamic absorption values after this dry cleaning treatment averaged 54.9 percent for the Example 2 treatment and 45.6 percent for the Example 3 treatment. The improved water repellency after dry cleaning is an unusual phenomenon, for most water repellent treatments are impaired if not destroyed by such dry cleaning.

Example 5

By the method of Example 1 a complex reaction product was prepared from 51.4 parts of a copolymer containing $HOCH_2CH_2CH_2MeSiO$ units and $Me_2SiO$ units in the molar ratio of 1/25 (0.028 mol hydroxypropyl substituents), 5.4 parts $CrO_2Cl_2$ (0.035 mol) and a total of 783 parts $CCl_4$ as diluent. A greenish-black glassy solid product was again obtained as the coordination complex, and it was found to be soluble in methanol and isopropanol.

Example 6

A complex reaction product was prepared by the method of Example 1 from a copolymer which consisted of $HOCH_2CH_2CH_2MeSiO$ units, $PhMeSiO$ units, and $Ph_2SiO$ units in the molar ratio of 1.86:1:1 (containing 0.167 mol hydroxypropyl substituents), 52.2 parts $CrO_2Cl_2$ (0.336 mol) and a total of 873 parts of $CCl_4$ as diluent. A brownish-black granular solid product was obtained which was soluble in methanol. A methanol solution containing 2 percent solids could be diluted until the methanol contained about 80 percent water before cloudiness developed.

Example 7

By the method of Example 1 a complex was prepared by reacting 50.9 parts of a copolymer containing 25 mol percent $HOCH_2CH_2CH_2MeSiO$ units and 75 mol percent $PhMeSiO$ units (0.097 mol hydroxypropyl substituents) with 16.7 parts $CrO_2Cl_2$ (0.108 mol) in a total of 800 parts $CCl_4$. The reaction product was again a greenish-black glassy solid which was soluble in methanol. When anhydrous ammonia is added to the methanol solution, ammonium chloride is precipitated and the ammoniated derivative of the original complex is produced.

Example 8

To a refluxing mixture of 68.4 parts $CrO_2Cl_2$ (0.441 mol) in 315 parts of dry $CCl_4$ was added 42 parts of a copolymer containing $HOCH_2CH_2CH_2MeSiO$ and $Me_2SiO$ units in a molar ratio of 1:3 (0.123 mol of hydroxypropyl substituents) in 317 parts $CCl_4$. Refluxing was continued for an additional 12 hours, after which ethanol was added to reduce the unreacted excess $CrO_2Cl_2$. The reaction mixture was then stripped of solvent over a steam bath, ending up at a pressure of 2 mm. Hg. The product was 96.8 parts of a gray-brown powdery solid. This product was soluble in methanol containing up to about 92 percent water. A 2 percent by weight solution in a methanol-water solvent containing 92 percent water was prepared and a strip of filter paper was dipped therein and allowed to air dry. The treated paper was found to be water repellent. Samples of wool and cotton were also dipped in this 2 percent solution and were then oven cured at 120° C. for 30 minutes. These cloth samples were water repellent and retained their water repellency after being washed with soap and water.

Example 9

Using the method of Example 8, a complex product was prepared by reacting 45.4 parts $CrO_2Cl_2$ (0.293 mol) and 60.8 parts of a copolymer containing

$HOCH_2CH_2CH_2MeSiO$ and $Me_2SiO$ units in the molar ratio of 1:4 (0.147 mol hydroxypropyl substituents) in a total of 631 parts $CCl_4$. There was no excess of the $CrO_2Cl_2$ used here, however, so no ethanol was added. The solvent-free product was a brownish-black granular solid which upon analysis showed a Si/Cr ratio of 2.5:1, this being the theoretical as well as the found value. The product was soluble in a methanol-water solvent containing up to about 92 percent by weight of water. As in Example 8, a 2 percent solids solution in the methanol-water solvent was used to treat various cloth samples, which upon oven curing at 120° C. for 30 minutes were highly water repellent.

Example 10

Using the method of Example 8 a complex was prepared by reacting 9.2 parts $CrO_2Cl_2$ (0.059 mol) with 54 parts of a copolymer containing $HOCH_2CH_2CH_2MeSiO$ and $Me_2SiO$ units in a molar ratio of 1:25 (0.028 mol hydroxypropyl substituents) in a total of 633 parts $CCl_4$. The solvent-free product was a greenish-black glassy appearing solid of a rather rubbery nature. This product was soluble in methanol containing up to about 50 percent by weight water.

Example 11

A mixture was prepared containing 35.6 parts $CrCl_3 \cdot 6H_2O$ (0.134 mol), 57.9 parts glacial acetic acid, and 76.3 parts of a copolymer containing

$HOOCCHMeCH_2MeSiO$ and $Me_2SiO$ units in the molar ratio of 1:6 (0.144 mol COOH). This mixture was heated to reflux and 83.7 parts (0.818 mol) of acetic anhydride was added dropwise during a 3 hour period. The refluxing was continued for an additional 3 hours and the reaction mixture was then distilled at 8 mm. Hg pressure to a pot temperature of 147° C. The residue was a greenish-black granular complex which was completely soluble in methanol. When a methanol solution of a portion of this product was evaporated to dryness and heated for 16 hours at 120° C. the resulting product would no longer redissolve in methanol. The solid product upon analysis showed a Si/Cr ratio of 3.2:1 and a Cl/Cr ratio of 1.38:1. A methanol solution of the product containing 2 percent solids rendered paper and various textile fabrics water repellent when applied thereto. A similar methanol soluble complex is obtained when a copolymer containing $HOOCCH_2CH_2MeSiO$ and $Me_2SiO$ units in the molar ratio of 1:6 is substituted for the copolymer used above in an otherwise identical process.

Example 12

When allyl acetate is reacted with tribromosilane at 110–120° C. in the presence of t-butylperbenzoate as a catalyst, the compound $Br_3SiCH_2CH_2CH_2OAc$ is obtained as a product. When 2.5 mols of the latter product is mixed with 0.1 mol $Si(OEt)_4$, 5 mols $PhEtSiCl_2$, 2.3 mols $ViSiCl_3$, and 0.1 mol $Me_3SiCl$ in an amount of toluene equal to the total weight of silanes and the mixture subjected to cohydrolysis with an excess of water, a toluene solution of a copolymer containing 25 mol percent $AcOCH_2CH_2CH_2SiO_{1.5}$, 1 mol percent $SiO_2$, 50 mol percent $PhEtSiO$, 23 mol percent $ViSiO_{1.5}$, and 1 mol percent $Me_3SiO_{.5}$ units is obtained. This toluene solution of the copolymer is then refluxed for several hours with dilute aqueous sodium hydroxide and the mixture neutralized with HCl to provide the corresponding copolymer in which the acetoxypropyl substituents have been converted to hydroxypropyl substituents. All water is then removed from the system by the azeotropic distillation of a portion of the toluene. When a sufficient amount of the resulting toluene solution of the copolymer to provide 0.1 mol of the hydroxypropyl substituents is reacted with 0.2 mol $CrO_2Cl_2$ in the manner of Example 9, a methanol soluble chromium coordination complex is obtained.

Example 13

When undecenyl acetate is reacted with $HSiBr_3$ in the presence of t-butylperbenzoate, the product

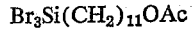

$Br_3Si(CH_2)_{11}OAc$ is obtained. When an equimolar mixture of the latter and $Me_2SiCl_2$ is hydrolyzed, saponified, and neutralized as in Example 12, the resulting copolymer contains $HO(CH_2)_{11}SiO_{1.5}$ and $Me_2SiO$ units in an equimolar ratio. The reaction of this copolymer with $CrO_2Cl_2$ in the manner of Example 9 provides a methanol soluble coordination complex of chromium.

Example 14

When $Me_3SiH$ is reacted with allyloxytrimethylsilane in the presence of chloroplatinic acid as a catalyst, the product obtained is $Me_3SiCH_2CH_2CH_2OSiMe_3$. The hydrolysis of the latter product provides a mixture of hexamethyldisiloxane and the compound $$Me_3SiCH_2CH_2CH_2OH$$

When 0.1 mol of the latter is reacted with 0.2 mol of $CrCl_3 \cdot 6H_2O$ in the manner of Example 11, the corresponding methanol soluble chromium coordination complex is obtained.

Example 15

The reaction of MePhSiHCl and methyl methacrylate in the presence of 1 percent by weight of a catalyst consisting of platinum deposited on finely divided charcoal (the catalyst itself containing 2 percent by weight platinum) produces the compound $$MePh(MeOOCCHMeCH_2)SiCl$$

When the latter is hydrolyzed and the hydrolyzate heated in the presence of the HCl produced by the hydrolysis, the disiloxane $[MePh(HOOCCHMeCH_2)Si]_2O$ is obtained. When 0.1 mol of the latter disiloxane (i.e. 0.2 mol COOH groups) is mixed with 220 parts $CCl_4$ and 5 parts of absolute ethanol, heating the mixture to reflux temperature during the slow addition of $CrO_2Cl_2$ leads to the in situ production of $Cr(OH)Cl_2$ and the resultant formation of the corresponding chromium coordination complex of the aforesaid disiloxane.

That which is claimed is:

1. A composition comprising a coordination complex of the group consisting of (1) a complex formed by reacting $Cr(OH)Cl_2$ with an organosilicon compound containing units of the formula $$R_nSi(R'COOH)O_{\frac{3-n}{2}}$$

where R is a monovalent hydrocarbon radical free of aliphatic unsaturation and having a maximum of 18 carbon atoms, R' is a divalent alkylene radical of from 2 to 18 inclusive carbon atoms with the carboxyl group being at least 2 carbon atoms removed from the Si, and n is an integer of from 0–3 inclusive, and (2) the hydrolyzed and ammoniated derivatives thereof.

2. A coordination complex formed by reacting $Cr(OH)Cl_2$ with an organosilicon compound containing units of the formula $$R_nSi(R'COOH)O_{\frac{3-n}{2}}$$

where R is a monovalent hydrocarbon radical free of aliphatic unsaturation and having a maximum of 18 carbon atoms, R' is a divalent alkylene radical of from 2 to 18 inclusive carbon atoms with the carboxyl group being at least 2 carbons atoms removed from the Si, and n is an integer of from 0–3 inclusive.

3. A coordination complex formed by reacting $Cr(OH)Cl_2$ with a copolymeric siloxane consisting essentially of the units of the formula (I)

$$R_ySi(R'COOH)O_{\frac{2-y}{2}}$$

where R is a monovalent hydrocarbon radical free of aliphatic unsaturation and having a maximum of 18 carbon atoms, R' is a divalent alkylene radical of from 2 to 18 inclusive carbon atoms with the carboxyl group being at least 2 carbon atoms removed from the Si, and y is an integer of from 0–2 inclusive, and (II)

$$R''_mSiO_{\frac{4-m}{2}}$$

where R'' represents a monovalent hydrocarbon radical free of acetylenic unsaturation and having a maximum of 18 carbon atoms, and m is an integer of from 0–3 inclusive, there being at least 3 molar percent of (I) units present in said copolymeric siloxane.

4. A coordination complex formed by reacting $Cr(OH)Cl_2$ with a copolymeric siloxane consisting essentially of units of the formula (I)

$$HOOCCHXCH_2(CH_3)SiO$$

where X is selected from the group consisting of hydrogen atoms and methyl radicals and (II)

$$(C_6H_5)_x(CH_3)_{2-x}SiO$$

where x is an integer from 0–2 inclusive, there being at least 3 molar percent of (I) in said copolymeric siloxane.

5. A coordination complex formed by reacting $CrO_2Cl_2$ with an organosilicon compound containing units of the formula $$R_nSi(R'CH_2OH)O_{\frac{3-n}{2}}$$

where R is a monovalent hydrocarbon radical free of aliphatic unsaturation and having a maximum of 18 carbon atoms, R' is a divalent alkylene radical of from 2 to 18 inclusive carbon atoms with the $(CH_2OH)$ group being at least 2 carbon atoms removed from the Si, and n is an integer of from 0–3 inclusive.

6. A coordination complex formed by reacting $CrO_2Cl_2$ with a copolymeric siloxane consisting essentially of units of the formula (I)

$$R_ySi(R'CH_2OH)O_{\frac{3-y}{2}}$$

where R is a monovalent hydrocarbon radical free of aliphatic unsaturation and having a maximum of 18 carbon atoms, R' is a divalent alkylene radical of from 2 to 18 inclusive carbon atoms with the $(CH_2OH)$ group being at least 2 carbon atoms removed from the Si, and y is an integer of from 0–2 inclusive, and (II)

$$R''_mSiO_{\frac{4-m}{2}}$$

where R'' represents a monovalent hydrocarbon radical free of acetylenic unsaturation and having a maximum of 18 carbon atoms, and m is an integer of from 0–3 inclusive, there being at least 3 molar percent of (I) units present in said copolymeric siloxane.

7. A coordination complex formed by reacting $CrO_2Cl_2$ with a copolymeric siloxane consisting essentially of units of the formula (I)

$$HOCH_2CH_2CH_2(CH_3)SiO$$

and (II) $(C_6H_5)_x(CH_3)_{2-x}SiO$ where x is an integer of from 0–2 inclusive, there being at least 3 molar percent of (I) in said copolymeric siloxane.

8. A coordination complex formed by reducing $CrO_2Cl_2$ to form $Cr(OH)Cl_2$ in the presence of an organosilicon compound containing units of the formula $$R_nSi(R'COOH)O_{\frac{3-n}{2}}$$

where R is a monovalent hydrocarbon radical free of aliphatic unsaturation and having a maximum of 18 carbon atoms, R' is a divalent alkylene radical of from 2 to 18 inclusive carbon atoms with the carboxyl being at least 2 carbon atoms removed from the Si, and n is an integer of from 0–3 inclusive.

9. A coordination complex formed by dehydrating $CrCl_3 \cdot 6H_2O$ to form $Cr(OH)Cl_2$ in the presence of an organosilicon compound containing units of the formula $$R_nSi(R'COOH)O_{\frac{3-n}{2}}$$

where R is a monovalent hydrocarbon radical free of aliphatic unsaturation and having a maximum of 18 carbon atoms, R' is a divalent alkylene radical of from 2 to 18 inclusive carbon atoms with the carboxyl group being at least 2 carbon atoms removed from the Si, and $n$ is an integer of from 0–3 inclusive.

10. A coordination complex formed by dehydrating $CrCl_3 \cdot 6H_2O$ by its reaction with acetic anhydride in glacial acetic acid to form $Cr(OH)Cl_2$ in the presence of a copolymeric siloxane consisting essentially of units of the formula (I) $[HOOCCH(X)CH_2](CH_3)SiO$ where X is selected from the group consisting of hydrogen atoms and methyl radicals, and (II) $(CH_3)_2SiO$, there being at least 3 molar percent of (I) units present in said siloxane.

References Cited in the file of this patent

UNITED STATES PATENTS

| | | |
|---|---|---|
| 2,273,040 | Iler | Feb. 17, 1942 |
| 2,589,445 | Sommer | Mar. 18, 1952 |
| 2,662,835 | Reid | Dec. 15, 1953 |
| 2,723,987 | Speier | Nov. 15, 1955 |

UNITED STATES PATENT OFFICE
Certificate of Correction

Patent No. 2,894,967  
July 14, 1959

John W. Gilkey

It is hereby certified that error appears in the printed specification of the above numbered patent requiring correction and that the said Letters Patent should read as corrected below.

Column 4, line 71, the formula should appear as shown below instead of as in the patent:

$$\equiv SiCH_2CH_2CH_2OOCCH_3$$

column 5, line 48, the formula should appear as shown below instead of as in the patent:

$$Cl_5SiMe_2(OCH_2CH=CH_2)_{1.5}$$

column 7, line 27, for "chloride-containing" read —chlorine-containing—; column 11, line 65, the formula should appear as shown below instead of as in the patent:

$$R_ySi(R'COOH)O_{\frac{3-y}{2}}$$

Signed and sealed this 8th day of December 1959.

[SEAL]

Attest:  
KARL H. AXLINE,  
*Attesting Officer.*

ROBERT C. WATSON,  
*Commissioner of Patents.*